United States Patent
Pieron et al.

(10) Patent No.: US 10,058,783 B2
(45) Date of Patent: *Aug. 28, 2018

(54) SYSTEM AND METHOD FOR PROVIDING LIMITED-TIME EVENTS TO USERS IN AN ONLINE GAME

(71) Applicant: Kabam, Inc., San Francisco, CA (US)

(72) Inventors: Luc Pieron, San Francisco, CA (US); Byung Gon Yoo, San Francisco, CA (US); Thomas Baxter, Millbrae, CA (US); Dylan Swift, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,770

(22) Filed: Nov. 15, 2017

(65) Prior Publication Data

US 2018/0071635 A1   Mar. 15, 2018

Related U.S. Application Data

(63) Continuation of application No. 14/620,185, filed on Feb. 12, 2015, now Pat. No. 9,827,499.

(51) Int. Cl.
*A63F 13/45* (2014.01)
*A63F 13/798* (2014.01)
(Continued)

(52) U.S. Cl.
CPC ............ *A63F 13/798* (2014.09); *H04L 67/10* (2013.01); *A63F 13/69* (2014.09)

(58) Field of Classification Search
CPC ......... A63F 13/798; A63F 13/69; H04L 67/10
(Continued)

(56) References Cited

U.S. PATENT DOCUMENTS 5,816,918 A   10/1998   Kelly
5,933,813 A    8/1999   Teicher
(Continued)

FOREIGN PATENT DOCUMENTS

KR   1020130137431   12/2013
WO      2002026333    1/2002
(Continued)

OTHER PUBLICATIONS

'Quest item—WoWWiki—Your guide to the World of Warcraft', printed from http://www.wowwiki.com/Quest_Item, Retrieved on Apr. 16, 2014, 1 page.
(Continued)

*Primary Examiner* — Allen Chan
(74) *Attorney, Agent, or Firm* — Sheppard Mullin Richter & Hampton LLP (57) ABSTRACT

A system and method configured to provide limited-time events to users in an online game. The system and method may include executing an instance of an online game and effectuating presentation of offers to users to activate a limited-time event within the online game. Activation of the limited-time event may enable users to perform event runs through the limited-time event for a duration. The execution of event runs through the limited-time event in response to user commands received from a client computing platform associated with the user may deplete the virtual resource in an inventory of the user. The system and method may maintain inventories of the users and recharge the virtual resource as a function of time. The performance of users may be assessed and awards may be distributed to the users based on the assessment of their performance during the event runs. The system and method may include effectuating exchanges by the users of virtual items for the first virtual resource.

20 Claims, 4 Drawing Sheets

(51) Int. Cl.
*H04L 29/08* (2006.01)
*A63F 13/69* (2014.01)

(58) Field of Classification Search
USPC .......................................................... 463/25
See application file for complete search history.

(56) References Cited

U.S. PATENT DOCUMENTS

| | | | |
|---|---|---|---|
| 5,964,660 A | 10/1999 | James | |
| 6,142,472 A | 11/2000 | Kliebisch | |
| 6,190,225 B1 | 2/2001 | Coleman | |
| 6,402,619 B1 | 6/2002 | Sato | |
| 6,561,904 B2 | 5/2003 | Locke | |
| 6,604,008 B2 | 8/2003 | Chudley | |
| 6,745,236 B1 | 6/2004 | Hawkins | |
| 6,811,483 B1 | 11/2004 | Webb | |
| 6,850,900 B1 | 2/2005 | Hare | |
| 6,928,474 B2 | 8/2005 | Venkatesan | |
| 7,050,868 B1 | 5/2006 | Graepel | |
| 7,076,453 B2 | 7/2006 | Jammes | |
| 7,156,733 B2 | 1/2007 | Chiang | |
| 7,192,352 B2 | 3/2007 | Walker | |
| 7,197,352 B2 | 3/2007 | Gott | |
| 7,326,115 B2 | 2/2008 | Baerlocher | |
| 7,381,133 B2 | 6/2008 | Thomas | |
| 7,533,336 B2 | 5/2009 | Jaffe | |
| 7,660,740 B2 | 2/2010 | Boone | |
| 7,682,239 B2 | 3/2010 | Friedman | |
| 7,698,229 B2 | 4/2010 | Hsu | |
| 7,785,188 B2 | 8/2010 | Cannon | |
| 7,813,821 B1 | 10/2010 | Howell | |
| 7,819,749 B1 | 10/2010 | Fish | |
| 7,945,802 B2 | 5/2011 | Hamilton, II | |
| 7,959,507 B2 | 6/2011 | Cannon | |
| 8,010,404 B1 | 8/2011 | Wu | |
| 8,016,668 B2 | 9/2011 | Hardy | |
| 8,047,909 B2 | 11/2011 | Walker | |
| 8,057,294 B2 | 11/2011 | Pacey | |
| 8,066,571 B2 | 11/2011 | Koster | |
| 8,105,156 B2 | 1/2012 | Walker | |
| 8,147,340 B2 | 4/2012 | BrunetdeCourssou | |
| 8,157,635 B2 | 4/2012 | Hardy | |
| 8,187,101 B2 | 5/2012 | Herrmann | |
| 8,226,472 B2 | 7/2012 | Van Luchene | |
| 8,231,453 B2 | 7/2012 | Wolf | |
| 8,231,470 B2 | 7/2012 | Feeney | |
| 8,239,487 B1 | 8/2012 | Hoffman | |
| 8,246,439 B2 | 8/2012 | Kelly | |
| 8,272,934 B2 | 9/2012 | Olive | |
| 8,272,951 B2 | 9/2012 | Ganz | |
| 8,272,956 B2 | 9/2012 | Kelly | |
| 8,282,491 B2 | 10/2012 | Auterio | |
| 8,287,367 B2 | 10/2012 | Hall | |
| 8,287,383 B1 | 10/2012 | Etter | |
| 8,287,384 B2 | 10/2012 | Auterio | |
| 8,292,743 B1 | 10/2012 | Etter | |
| 8,313,372 B2 | 11/2012 | Naicker | |
| 8,317,584 B2 | 11/2012 | Aoki | |
| 8,317,601 B1 | 11/2012 | Luciano, Jr. | |
| 8,323,110 B2 | 12/2012 | Shibamiya | |
| 8,328,642 B2 | 12/2012 | Mosites | |
| 8,332,260 B1 | 12/2012 | Mysen | |
| 8,332,544 B1 | 12/2012 | Rails | |
| 8,348,716 B2 | 1/2013 | Ganz | |
| 8,348,762 B1 | 1/2013 | Willis | |
| 8,348,767 B2 | 1/2013 | Mahajan | |
| 8,348,768 B2 | 1/2013 | Auterio | |
| 8,360,858 B2 | 1/2013 | LaRocca | |
| 8,360,866 B2 | 1/2013 | VanLuchene | |
| 8,360,867 B2 | 1/2013 | VanLuchene | |
| 8,360,868 B2 | 1/2013 | Shvili | |
| 8,366,544 B2 | 2/2013 | Walker | |
| 8,366,550 B2 | 2/2013 | Herrmann | |
| 8,371,925 B2 | 2/2013 | Bonney | |
| 8,376,826 B2 | 2/2013 | Katz | |
| 8,382,572 B2 | 2/2013 | Hoffman | |
| 8,388,427 B2 | 3/2013 | Yariv | |
| 8,401,913 B2 | 3/2013 | Alivandi | |
| 8,408,989 B2 | 4/2013 | Bennett | |
| 8,439,759 B1 | 5/2013 | Mello | |
| 8,475,262 B2 | 7/2013 | Wolf | |
| 8,506,394 B2 | 8/2013 | Kelly | |
| 8,512,150 B2 | 8/2013 | Herrmann | |
| 8,533,076 B2 | 9/2013 | Chu | |
| 8,583,266 B2 | 11/2013 | Herbrich | |
| 8,636,591 B1 | 1/2014 | Hawk | |
| 8,758,119 B1 | 6/2014 | Bronsteinbendayan | |
| 8,777,754 B1 | 7/2014 | Santini | |
| 8,784,214 B2 | 7/2014 | Parks | |
| 8,790,185 B1 | 7/2014 | Caldarone | |
| 8,821,260 B1 | 9/2014 | DeSanti | |
| 8,831,758 B1 | 9/2014 | Chu | |
| 8,843,557 B2 | 9/2014 | Ranade | |
| 8,851,978 B1 | 10/2014 | Koh | |
| 8,920,243 B1 | 12/2014 | Curtis | |
| 8,961,319 B1 | 2/2015 | Pieron | |
| 8,968,067 B1 | 3/2015 | Curtis | |
| 9,007,189 B1 | 4/2015 | Curtis | |
| 9,138,639 B1 | 9/2015 | Ernst | |
| 9,256,887 B2 | 2/2016 | Santini | |
| 9,257,007 B2 | 2/2016 | Santini | |
| 9,259,642 B1 | 2/2016 | David McNeill | |
| 9,286,510 B2 | 3/2016 | Soohoo | |
| 9,317,993 B2 | 4/2016 | Hardy | |
| 9,375,636 B1 | 6/2016 | Wakeford | |
| 9,403,093 B2 | 8/2016 | Harrington | |
| 9,406,201 B2 | 8/2016 | Englman | |
| 9,452,356 B1 | 9/2016 | Tsao | |
| 9,452,364 B1 | 9/2016 | Curtis | |
| 9,463,376 B1 | 10/2016 | Kim | |
| 9,468,851 B1 | 10/2016 | Pieron | |
| 9,610,503 B2 | 4/2017 | Pieron | |
| 9,626,475 B1 | 4/2017 | Schultz | |
| 9,656,174 B1 | 5/2017 | McLellan et al. | |
| 9,669,313 B2 | 6/2017 | Pieron | |
| 9,682,314 B2 | 6/2017 | Kim | |
| 9,782,679 B1 | 10/2017 | Chu | |
| 9,789,407 B1 | 10/2017 | Pieron | |
| 2002/0023039 A1 | 2/2002 | Fritsch | |
| 2002/0059397 A1 | 5/2002 | Feola | |
| 2002/0072412 A1 | 6/2002 | Young | |
| 2002/0094863 A1 | 7/2002 | Klayh | |
| 2002/0095327 A1 | 7/2002 | Zumel | |
| 2002/0115488 A1 | 8/2002 | Berry | |
| 2002/0119824 A1 | 8/2002 | Allen | |
| 2002/0165794 A1 | 11/2002 | Ishihara | |
| 2002/0183105 A1 | 12/2002 | Cannon | |
| 2002/0193162 A1 | 12/2002 | Walker | |
| 2003/0008713 A1 | 1/2003 | Ushiro | |
| 2003/0027619 A1 | 2/2003 | Nicastro | |
| 2003/0032476 A1 | 2/2003 | Walker | |
| 2003/0102625 A1 | 6/2003 | Katz | |
| 2003/0109301 A1 | 6/2003 | Chudley | |
| 2003/0157978 A1 | 8/2003 | Englman | |
| 2003/0174178 A1 | 9/2003 | Hodges | |
| 2003/0190960 A1 | 10/2003 | Jokipii | |
| 2003/0216167 A1 | 11/2003 | Gauselmann | |
| 2004/0002387 A1 | 1/2004 | Grady | |
| 2004/0068451 A1 | 4/2004 | Lenk | |
| 2004/0143852 A1 | 7/2004 | Meyers | |
| 2004/0199471 A1 | 10/2004 | Hardjono | |
| 2004/0215524 A1 | 10/2004 | Parkyn | |
| 2004/0224745 A1 | 11/2004 | Bregenzer | |
| 2004/0225387 A1 | 11/2004 | Smith | |
| 2004/0267611 A1 | 12/2004 | Hoerenz | |
| 2005/0096117 A1 | 5/2005 | Katz | |
| 2005/0114223 A1 | 5/2005 | Schneider | |
| 2005/0165686 A1 | 7/2005 | Zack | |
| 2005/0192087 A1 | 9/2005 | Friedman | |
| 2005/0209008 A1 | 9/2005 | Shimizu | |
| 2005/0227751 A1 | 10/2005 | Zanelli | |
| 2005/0255914 A1 | 11/2005 | McHale | |
| 2005/0277474 A1 | 12/2005 | Barry | |
| 2006/0030407 A1 | 2/2006 | Thayer | |

(56) References Cited

U.S. PATENT DOCUMENTS

| | | |
|---|---|---|
| 2006/0058103 A1 | 3/2006 | Danieli |
| 2006/0063587 A1 | 3/2006 | Manzo |
| 2006/0100006 A1 | 5/2006 | Mitchell |
| 2006/0116196 A1 | 6/2006 | Vancura |
| 2006/0155597 A1 | 7/2006 | Gleason |
| 2006/0200370 A1 | 9/2006 | Ratliff |
| 2006/0217198 A1 | 9/2006 | Johnson |
| 2006/0287029 A1 | 12/2006 | Yoshinobu |
| 2006/0287102 A1 | 12/2006 | White |
| 2007/0021213 A1 | 1/2007 | Foe |
| 2007/0077988 A1 | 4/2007 | Friedman |
| 2007/0105615 A1 | 5/2007 | Lind |
| 2007/0111770 A1 | 5/2007 | Van Luchene |
| 2007/0129139 A1 | 6/2007 | Nguyen |
| 2007/0129147 A1 | 6/2007 | Gagner |
| 2007/0155485 A1 | 7/2007 | Cuddy |
| 2007/0191101 A1 | 8/2007 | Coliz |
| 2007/0191102 A1 | 8/2007 | Coliz |
| 2007/0213116 A1 | 9/2007 | Crawford |
| 2007/0233585 A1 | 10/2007 | Ben Simon |
| 2007/0281285 A1 | 12/2007 | Jayaweera |
| 2008/0004093 A1 | 1/2008 | Van Luchene |
| 2008/0032787 A1 | 2/2008 | Low |
| 2008/0058092 A1 | 3/2008 | Schwartz |
| 2008/0076527 A1 | 3/2008 | Low |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo |
| 2008/0194318 A1 | 8/2008 | Kralicky |
| 2008/0200260 A1 | 8/2008 | Deng |
| 2008/0207306 A1 | 8/2008 | Higbie |
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0268946 A1 | 10/2008 | Roemer |
| 2008/0275786 A1 | 11/2008 | Gluck |
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0082099 A1 | 3/2009 | Luciano |
| 2009/0124353 A1 | 5/2009 | Collette |
| 2009/0204907 A1 | 8/2009 | Finn |
| 2009/0208181 A1 | 8/2009 | Cottrell |
| 2009/0210301 A1 | 8/2009 | Porter |
| 2009/0234710 A1 | 9/2009 | Belgaied Hassine |
| 2009/0280905 A1 | 11/2009 | Weisman |
| 2009/0315893 A1 | 12/2009 | Smith |
| 2010/0022307 A1 | 1/2010 | Steuer |
| 2010/0035689 A1 | 2/2010 | Altshuler |
| 2010/0041472 A1 | 2/2010 | Gagner |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney |
| 2010/0107214 A1 | 4/2010 | Ganz |
| 2010/0113162 A1 | 5/2010 | Vemuri |
| 2010/0120525 A1 | 5/2010 | Baerlocher |
| 2010/0174593 A1 | 7/2010 | Cao |
| 2010/0198653 A1 | 8/2010 | Bromenshenkel |
| 2010/0210356 A1 | 8/2010 | Losica |
| 2010/0227675 A1 | 9/2010 | Luxton |
| 2010/0227682 A1 | 9/2010 | Reville |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2010/0306015 A1 | 12/2010 | Kingston |
| 2011/0045898 A1 | 2/2011 | Anderson |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia |
| 2011/0212756 A1 | 9/2011 | Packard |
| 2011/0218033 A1 | 9/2011 | Englman |
| 2011/0227919 A1 | 9/2011 | Bongio |
| 2011/0250954 A1 | 10/2011 | Braund |
| 2011/0256936 A1 | 10/2011 | Walker |
| 2011/0263324 A1 | 10/2011 | Ganetakos |
| 2011/0275438 A9 | 11/2011 | Hardy |
| 2011/0281638 A1 | 11/2011 | Bansi |
| 2011/0281654 A1 | 11/2011 | Kelly |
| 2011/0282764 A1 | 11/2011 | Borst |
| 2011/0300923 A1 | 12/2011 | VanLuchene |
| 2011/0319152 A1 | 12/2011 | Ross |
| 2011/0319170 A1 | 12/2011 | Shimura |
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman |
| 2012/0040743 A1 | 2/2012 | Auterio |
| 2012/0040761 A1 | 2/2012 | Auterio |
| 2012/0042282 A1 | 2/2012 | Wong |
| 2012/0046111 A1 | 2/2012 | Walker |
| 2012/0047002 A1 | 2/2012 | Patel |
| 2012/0059730 A1 | 3/2012 | Jensen |
| 2012/0083909 A1 | 4/2012 | Carpenter |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0202589 A1 | 8/2012 | Kelly |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider |
| 2012/0265604 A1 | 10/2012 | Corner |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0302329 A1 | 11/2012 | Katz |
| 2012/0302335 A1 | 11/2012 | Gregory-Brown |
| 2012/0309504 A1 | 12/2012 | Isozaki |
| 2012/0311504 A1 | 12/2012 | van Os |
| 2012/0322545 A1 | 12/2012 | Arnone |
| 2012/0322561 A1 | 12/2012 | Kohlhoff |
| 2012/0329549 A1 | 12/2012 | Johnson |
| 2012/0330785 A1 | 12/2012 | Hamick |
| 2013/0005437 A1 | 1/2013 | Bethke |
| 2013/0005466 A1 | 1/2013 | Mahajan |

(56) References Cited

U.S. PATENT DOCUMENTS

| | | |
|---|---|---|
| 2013/0005473 A1 | 1/2013 | Bethke |
| 2013/0005480 A1 | 1/2013 | Bethke |
| 2013/0006735 A1 | 1/2013 | Koenigsberg |
| 2013/0006736 A1 | 1/2013 | Bethke |
| 2013/0012304 A1 | 1/2013 | Cartwright |
| 2013/0013094 A1 | 1/2013 | Parks |
| 2013/0013326 A1 | 1/2013 | Miller |
| 2013/0013459 A1 | 1/2013 | Kerr |
| 2013/0029745 A1 | 1/2013 | Kelly |
| 2013/0036064 A1 | 2/2013 | Osvald |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1 | 4/2013 | Allen |
| 2013/0123005 A1 | 5/2013 | Allen |
| 2013/0124361 A1 | 5/2013 | Bryson |
| 2013/0151342 A1 | 6/2013 | Citron |
| 2013/0173393 A1 | 7/2013 | Calman |
| 2013/0178259 A1 | 7/2013 | Strause |
| 2013/0210511 A1 | 8/2013 | LaRocca |
| 2013/0217453 A1 | 8/2013 | Briggs |
| 2013/0217489 A1 | 8/2013 | Bronstein Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0260850 A1 | 10/2013 | Carpe |
| 2013/0288757 A1 | 10/2013 | Guthridge |
| 2013/0288787 A1 | 10/2013 | Yoshie |
| 2013/0290147 A1 | 10/2013 | Chandra |
| 2013/0303276 A1 | 11/2013 | Weston |
| 2013/0310164 A1 | 11/2013 | Walker |
| 2013/0324259 A1 | 12/2013 | McCaffrey |
| 2013/0339111 A1 | 12/2013 | Ross |
| 2013/0339228 A1 | 12/2013 | Shuster |
| 2013/0344932 A1 | 12/2013 | Adams |
| 2014/0004884 A1 | 1/2014 | Chang |
| 2014/0011565 A1 | 1/2014 | Elias |
| 2014/0018156 A1 | 1/2014 | Rizzotti |
| 2014/0033262 A1 | 1/2014 | Anders |
| 2014/0038679 A1 | 2/2014 | Snow |
| 2014/0038721 A1 | 2/2014 | Archer |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0128137 A1 | 5/2014 | Balise |
| 2014/0157314 A1 | 6/2014 | Roberts |
| 2014/0180725 A1 | 6/2014 | Ton-That |
| 2014/0206449 A1 | 7/2014 | Alman |
| 2014/0206452 A1 | 7/2014 | Bambino |
| 2014/0243065 A1 | 8/2014 | Wright |
| 2014/0243072 A1 | 8/2014 | Santini |
| 2014/0274359 A1 | 9/2014 | Helava |
| 2014/0295958 A1 | 10/2014 | Shono |
| 2014/0309026 A1 | 10/2014 | Inukai |
| 2014/0329585 A1 | 11/2014 | Santini |
| 2014/0337259 A1 | 11/2014 | Lamb |
| 2015/0011305 A1 | 1/2015 | Deardorff |
| 2015/0019349 A1 | 1/2015 | Milley |
| 2015/0031440 A1 | 1/2015 | Desanti |
| 2015/0065241 A1 | 3/2015 | McCarthy |
| 2015/0065256 A1 | 3/2015 | Cudak |
| 2015/0273320 A1 | 10/2015 | Pieron |
| 2015/0306494 A1 | 10/2015 | Pieron |
| 2015/0335995 A1 | 11/2015 | McLellan |
| 2015/0352436 A1 | 12/2015 | Pieron |
| 2016/0121219 A1 | 5/2016 | Kim |
| 2016/0236094 A1 | 8/2016 | Pieron |
| 2016/0361654 A1 | 12/2016 | Pieron |

FOREIGN PATENT DOCUMENTS

| | | |
|---|---|---|
| WO | 2013013281 | 1/2013 |
| WO | 2013059639 | 1/2013 |
| WO | 2013116904 | 1/2013 |
| WO | 2015013373 | 1/2015 |
| WO | 2015153010 | 10/2015 |
| WO | 2015168187 | 11/2015 |
| WO | 2015179450 | 11/2015 |
| WO | 2015196105 | 12/2015 |

OTHER PUBLICATIONS

"A Wondrous Drop Event and Double EXP", [dated Aug. 22, 2012]. From flyff-wiki. [online], [retrieved on Jan. 12, 2016]. Retrievedfrom the Internet <URL:http://flyff-wiki.webzen.com/wiki/A_Wondrous_ Drop_Event_and_Double_EXP>. 2 pages.

"Behavioural Analytics & Campaigning", http://lotaris.com/behavioural._analytics_and._Campaigning.htm, screenshot access date May 24, 2012 2:21 PM, 1 page.

"Building Structures". War2.warcraft.org. Online. Accessed via the Internet. Accessed Aug. 9, 2014. <URL: http://war2.warcraft.org/strategy/verybasics/building.shtml>, 3 pages.

"Clash of Clans". Wikipedia.org. Online. Accessed via the Internet. Accessed Aug. 9, 2014. <URL: http://en.wikipedia.org/wiki/Clash of Clans>, 3 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", Lotaris Press Release, http://www.lotaris.com/digital_river_world_payments_and_lotaris_partne . . . , posted Tuesday, Mar. 27, 2012, screenshop access date May 24, 2012, 2:19 PM, 1 page.

"Flyff", [dated May 25, 2013]. From Wikipedia, The Free Encyclopedia. [on line], [retrieved on Jan. 12, 2016]. Retrieved from the Internet<URL:https://en.wikipedia.org/w/index.php?title=Flyff&oldid=556751091 >. 4 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Getting Started" written by BoD, published on Oct. 13, 2011 and printed from URL <http://lotrowiki.com/index.php?title=Getting_Started&oldid=349681 >, 5 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Lotro Store" written by Elinnea, published on Dec. 15, 2011 and printed from URL <http://lotrowiki.com/index.php ?title=LOTRO_Store&oldid=396550>, 23 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--_Part_2&oldid=399366, http://lotro-wiki.com/index.php?title=Getting_Started&oldid=349681, Links are to used articles, 33 pages.

(56) References Cited

OTHER PUBLICATIONS

"Lotro-Wiki.com" (evidence in regards to "Lord of the Rings Oline" MMORPG game), latest Dec. 22, 2011, <http://lotrowiki.com/index.php/Main_Page), http://lotro-wiki.com/index.php?title=LOTRO_Store&oldid=396550, http://lotro-wiki.com/index.php?title=Quest:A_Little_Extra Never_Hurts_--_Part_1&oldid=399597, http://lotro-wiki.com/index.php?title=Quest:A_Little_Extra_Never_Hurts_--_Part_2&oldid=399366, http://lotro-wiki.com/index.ph?title=Getting_Started&oldid=349681, Links are to used articles, 33 pages.
"Main Page" written by Starbusty, published on Dec. 12, 2011 and printed from URL <http://lotrowiki.com/index.php?title=Main_Page&oldid=394429>, 2 pages.
"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_--_Part_1&oldid=399597>, 3 pages.
"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_--_Part_2&oldid=399366>, 2 pages.
"Scroll of Amplification R", [dated Apr. 26, 2012]. From flyff-wiki. [online], [retrieved on Jan. 12, 2016]. Retrieved from the Internet<URL:http://flyff-wiki.webzen.com/wiki/Scroll_of_Amplification_R>. 3 pages.
"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.
<http://lotro-wiki.com/index.php?title=Ouest:A_Little_Extra_Never_Hurts_--_Part_2&oldid=399366>, <http://lotrowiki.com/index.php?title=Getting_Started&oldid=349681 >. Links are to used articles. (7 pgs) Feb. 26, 2014.
City Coins. CityVille Wikia. Online. Accessed via the Internet. Accessed Aug. 9, 2014. <URL: http://cityville.wikia.com/wiki/City_Coins>, 2 pages.
Elsword—Wikipedia, the free encyclopedia, URL: en.wikipedia.org/wiki/Elsword [Retrieved Feb. 21, 2013], 6 pages.
FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.
Gaia "Black Friday Bundle" available on Nov. 23, 2011, from http://www.gaiaonline.com/forum/community-announcements/black-friday-big-bundles-rare-items/t.76127933/, 5 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.
Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.
MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.
New Feature: Tiered Tournaments and Tournament Updates, printed from http://community.kabam.com/forums/showthread.php?171349-New-Feat on Feb. 11, 2014, 2 pages.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
PCT International Search Report and Written Opinion for PCT/US2016/017637 dated Apr. 7, 2016, 12 pages.
TFWiki "teamfortress wiki" available Nov. 5, 2011 retrieved from https://web.archive.org/web/20111105044256/http://wiki.teamfortress.com/wiki/Loadout, 4 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online", available on Sep. 9, 2011, https://web.archive.org/web/20110927210155/http://en.wikipedia.org/wiki/Gaia_Online, 8 pages.
Wikipedia, Mafia Wars, <http://en.wikipedia.org/wiki/Mafia_Wars>, Jan. 28, 2012, 3 pages.
"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.
"Cataclysm Guide: Guild Advancement—Wowhead", http://www.wowhead.com/guide=cataclysm&guilds, printed Dec. 5, 2013, 4 pages.
"Guild Housing System—FlyFF Wiki", http://flyff-wiki.gpotato.com/wiki/Guild_Housing_System, printed Dec. 5, 2013, 5 pages.
"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.
"Rest—WoWWiki—Your guide to the World of Warcraft", printed from http://www.wowwiki.com/Rest, May 19, 2014, 2 pages.
Diablo 2, Blizzard Entertainment, Mar. 23, 2009, manual and online website, http://web.archive.Org/web/20090323171356/http://classic.battle.net/diablo 2exp/items/basics.shtml, 51 pages.
Dreamslayer's Enchanting and Upgrading Guide—With Pictures:D and Explanations, URL: forums.elswordonline.com/Topic5673.aspx [Retrieved Feb. 21, 2013], 8 pages.
Elsword, Dec. 27, 2007, KOG Studios, Guide posted Mar. 17, 2011, http://forums.elswordonline.com/topic5673.aspx, http://en.wikipedia.org/wiki/Elsword, 16 pages.
Gem System—Street Fighter X Tekken, http://www.streetfighter.com/us/sfxtk/features/gem-system, printed Nov. 6, 2012, 6 pages.
MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.
MapleStory—Guides—Equipment Upgrading 101: Enhancements, URL: maplestory.nexon.net/guides/game-play/systems/OOFlk; [Retrieved Jun. 24, 2013] 3 pages.
MapleStory—Guides—Equipment Upgrading 101: Potentials, URL: maplestory.nexon.net/guides/game-play/systems/OOFlj/ [Retrieved Jun. 24, 2013], 5 pages.
MapleStory—Guides—Equipment Upgrading 101: Scrolls, URL: maplestory.nexon.net/guides/game-play/systems/OOFFV/#mitigating [Retrieved Jun. 24, 2013], 4 pages.
Path of Exile, Internet posting: http://web.archive.org/web/20120606004658/http://www.pathofexile.com/forum/view-thread/12056, Nov. 16, 2011, 52 pages.
Profession—WoWWiki—Your guide to the World of Warcraft, URL: http://www.wowwiki.com/Profession, printed Nov. 6, 2012, 8 pages.
Super Mario Bros. 3, NES Gameplay, http://www.youtube.com/watch?v=82TL-Acm4ts, Published on Mar 14, 2009, 1 page.
Super Mario Bros. 3, StrategyWiki, the video game walkthrough and strategy guide, http://strategywiki.org/wiki/Super_Mario_Bros._3, Oct. 2, 2012, 4 pages.
Super Mario Bros. 3 Review, Nintendo for NES, Feb. 1990, pp. 1-4.
TFF Challenge—UC Davis, http://tffchallenge.com/team/uc-davis/, printed Jan. 15, 2014, 12 pages.
The Arreat Summit—Items: Basic Item Information, URL: web.archive.org/web/20090323171356/http://classic.battle.net/diablo2exp/items/basics.shtml [Retrieved Feb. 21, 2013], 3 pages.

SYSTEM AND METHOD FOR PROVIDING LIMITED-TIME EVENTS TO USERS IN AN ONLINE GAME

FIELD OF THE DISCLOSURE

This disclosure relates to a system and method for providing limited-time events to users in an online game.

BACKGROUND

Bonus events are provided in games to give users an opportunity to win additional and/or better prizes. Typically, a bonus event is provided at a specific time or based on a given level of achievement. In instances where a bonus event is provided at a specific time, only users playing the game at that time are given the opportunity to play. Providing a bonus event at a specific time unnecessarily limits the number of users who can participate in the event to those playing the game at that time.

As such, alternative methods of providing limited-time events to users in an online game may enable more users to participate in limited-time events.

SUMMARY

One aspect of the disclosure relates to a system and method configured to provide limited-time events to users in an online game. Exemplary implementations may provide offers to active a limited-time event to users in the online game. The limited-time event may be offered to users when they are online and may be activated by one or more users. The limited-time event may be activated by different users at different times. Activation of the limited-time event may enable a user to perform event runs through the limited-time event. The user may be able to perform event runs through the limited-time event for a duration. The duration may have a duration length indicating the duration period. Providing individual offers to users for the limited-time event at various times, according to their online schedule, removes the limitations presented by providing an event during one specific time period to only those users that are online. The time limitation aspect of the limited-time event maintains the enticing sense of urgency for users to participate in the event.

In some implementations, providing limited-time events to users in an online game may be performed by processors executing computer program components. In some implementations, the system may include one or more servers. The server(s) may be configured to communicate with one or more client computing platforms according to a client/server architecture. The users may access the system via client computing platform(s), for instance to engage in one or more games.

The server(s) may be configured to execute one or more computer program components to provide limited-time events to users in an online game. The computer program components may include one or more of an event component, a game component, an inventory component, a recharge component, a performance component, an award component, an exchange component, and/or other components. It is noted that the client computing platforms may include one or more computer program components that are the same as or similar to the computer program components of the server(s) to facilitate in game actions.

The event component may be configured to effectuate presentation of offers to users to activate a limited-time event within an online game. Activation of the limited-time event may enable users to perform event runs through the limited-time event in the online game for a duration. The duration may have a duration length and the durations for the individual users may begin in response to offer activations by the individual users. In some implementations, presentation of offers may be effectuated during an offer period. The offer period may include a period of time during which the first user may be able to accept the offer. In some implementations, the first user may only accept the offer to activate the limited-time event once during an offer period. The first user may only be able to perform event runs through the limited-time event for one duration per offer period. In some implementations, the event component may be configured to effectuate presentation of one or more notifications with one or more offers to activate the limited-time event.

The game component may be configured to execute an instance of the online game. The instance of the online game may facilitate user participation in the online game by executing actions in the instance of the online game in response to user commands received from client computing platforms associated with the users. The execution of actions in the instance of the online game may deplete a first virtual resource in the inventories of the users requesting the actions. The execution of event runs through the limited-time event in response to user commands received from a client computing platform associated with the user may deplete the first virtual resource in an inventory of the user.

In some implementations, the game component may be configured to effectuate presentation of one or more notifications within the instance of the online game and/or during the limited-time event. The one or more notifications may be presented after activation of the limited-time event and/or based on the assessment of the performance of one or more of the users during event runs through the limited time event. In some implementations, game component may be configured to effectuate presentation of one or more leaderboards. The one or more leaderboards may include a performance assessment metric of one or more users during one or more event runs through the limited time event.

The inventory component may be configured to maintain inventories of the users. The recharge component may be configured to recharge the first virtual resource in the inventories of the users as a function of time. The performance component may be configured to assess performance of the users during event runs through the limited-time event. The award component may be configured to distribute awards to the users based on the assessment of the performance of the users during the event runs through the limited-time event. In some implementations, the awards may include one or more of a virtual hard currency, a virtual soft currency, and/or other awards.

The exchange component may be configured to effectuate exchanges by the users of virtual items for the first virtual resource. A number of event runs that are performable by the first user during the duration without exchanging one or more virtual items for the first virtual resource may be limited by the recharge of the first virtual resource, the depletion of the first virtual resource by performance of event runs, the duration length, and/or other factors. Virtual items exchanged for the first virtual resource may include a virtual currency such as a virtual hard currency.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
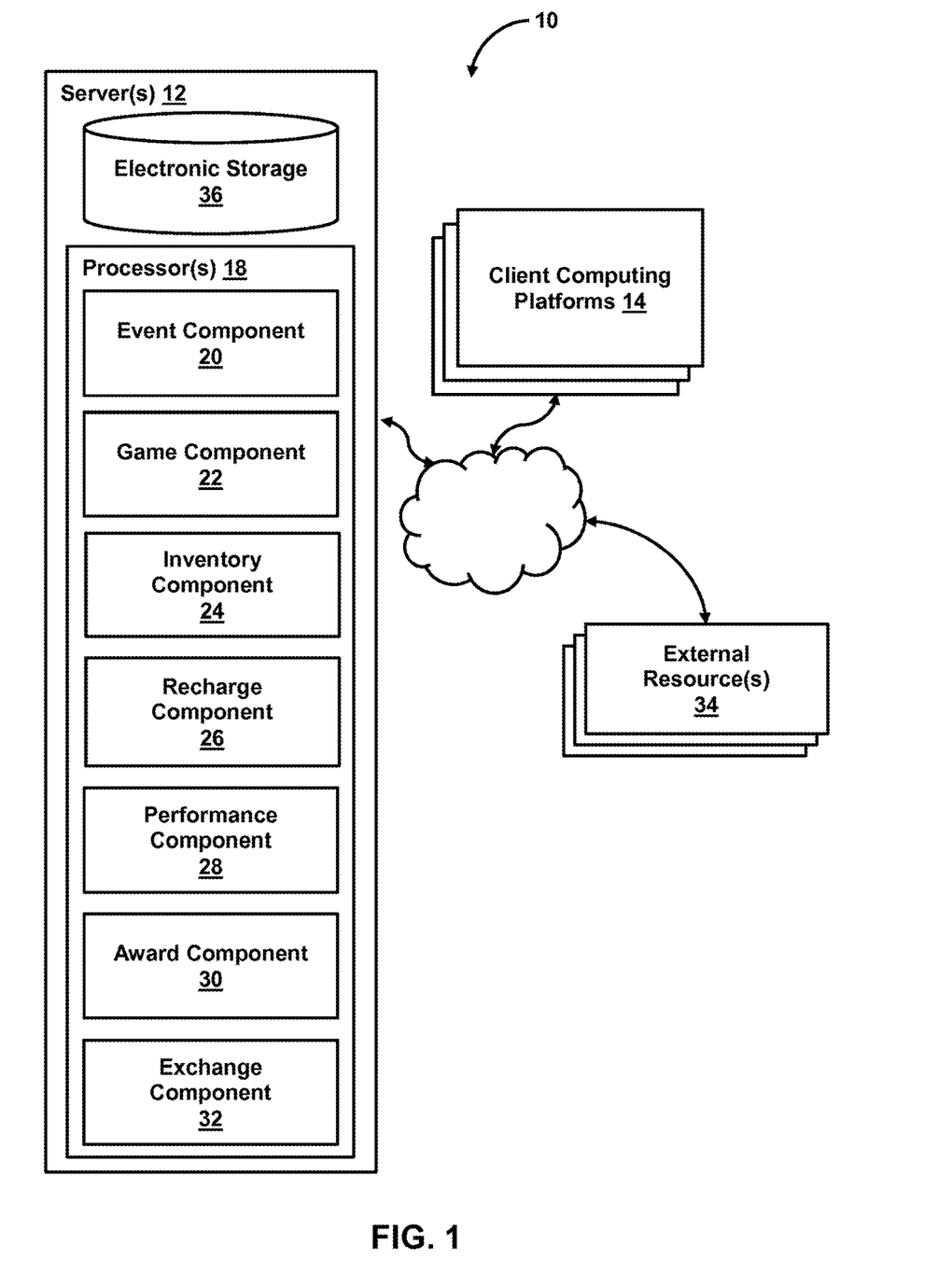
FIG. 1 illustrates a system for providing limited-time events to users in an online game, in accordance with one or more implementations.

FIG. 1 illustrates a system 10 for providing limited-time events to users in an online game. System 10 is only one example of a suitable computing environment and is not intended to suggest any limitation as to the scope of use or functionality of the features described herein. The system may be configured to provide a virtual space to users, wherein instances online game are provided within the virtual space. Providing the virtual space may include hosting the virtual space over a network. In some implementations, system 10 may include one or more server(s) 12. The server(s) 12 may be configured to communicate with one or more client computing platforms 14 according to a client/server architecture. The users may access system 10 and/or the virtual space via client computing platforms 14.

The server(s) 12 may be configured to execute one or more computer program components. The computer program components may include one or more of an event component 20, a game component 22, an inventory component 24, a recharge component 26, a performance component 28, an award component 30, an exchange component 32, and/or other components. It is noted that the client computing platforms 14 may include one or more computer program components that are the same as or similar to the computer program components of the server(s) 12 to facilitate in game actions.

Event component 20 may be configured to effectuate presentation of offers to users to activate a limited-time event within an online game. Presentation of offers to users may be effectuated via a graphical user interface presented within a virtual space. The graphical user interface may include one or more input fields. The input fields may include one or more graphical control elements such as one or more of a button, a toggle, a dropdown, a text box, a checkbox, and/or other graphical control elements. Offers to activate a limited-time event may be presented in the one or more input fields of the graphical user interface. The one or more input fields may include one or more graphical control elements for receiving a user input in response to the offer to activate the limited-time event.

Event component 20 may be configured to effectuate presentation of offers to users when they are online. As such, presentation of an offer to activate the limited-time event may be presented to a first user at a different time than it is presented to a second user. The limited-time event may be activated by one or more users. In some implementations, the limited-time event may be activated by one or more users via acceptance of the offer. In some implementations, activation of the limited-time event may occur separately from acceptance of the limited-time event by one or more users. The limited-time event may be activated by different users at different times.

Activation of the limited-time event may enable the user to perform event runs through the limited-time event. In some implementations, the limited-time event may include one or more of a secondary game, a challenge within a game, a level or round within a game, a side game, and/or other limited-time events. The limited-time event may allow for asynchronous, synchronous, or semi-synchronous gameplay. The user may be able to perform event runs through the limited-time event for a duration. The duration may have a duration length indicating the duration period. By way of non-limiting example, if the duration length is one hour, then the duration period may start when the limited-time event is activated by the user and end one hour later. In some implementations, the duration is a period of time during which the user may be enabled to perform event runs. Once the duration has ended, the user may no longer be able to perform event runs through the limited-time events, and/or the actions associated with performing an event run in a game may not be credited to the user as performance of an event run. That is, outside of the duration, actions that would have qualified as an event run for the purpose of the event may only count as typical gameplay outside of an event. Once the duration has begun in response to event activation, a user may not be able to stop, pause, re-start, and/or otherwise adjust the duration length.

In some implementations, event component 20 may be configured to effectuate presentation of offers to users during an offer period. The offer period may include a period of time during which the first user may be able to accept the offer. In some implementations, the first user may only accept the offer to activate the limited-time event once during an offer period. The first user may only be able to perform event runs through the limited-time event for one duration per offer period. In some implementations, event component 20 may be configured to effectuate presentation of offers to users that have not yet accepted the limited-time event during the offer period. As such, a user may only accept the offer for the limited-time event once in a given offer period. In some implementations, acceptance of the offer to activate the limited time event may activate the limited-time event, starting the duration. In some implementations, acceptance of the offer to activate the limited time event may not activate the limited time event.

The offer period may be longer than the duration. By way of non-limiting example, the offer period may include one calendar day and the user may be presented with an offer to activate the limited-time event when they access the instance of the online game on the morning of the calendar day. Continuing the example, the user may accept the morning offer and activate the limited-time event, or the user may wait and accept a second offer to activate the limited-time in the afternoon; either way, the user may only be able to accept the offer to activate the limited-time event once that day.

Figure 2:
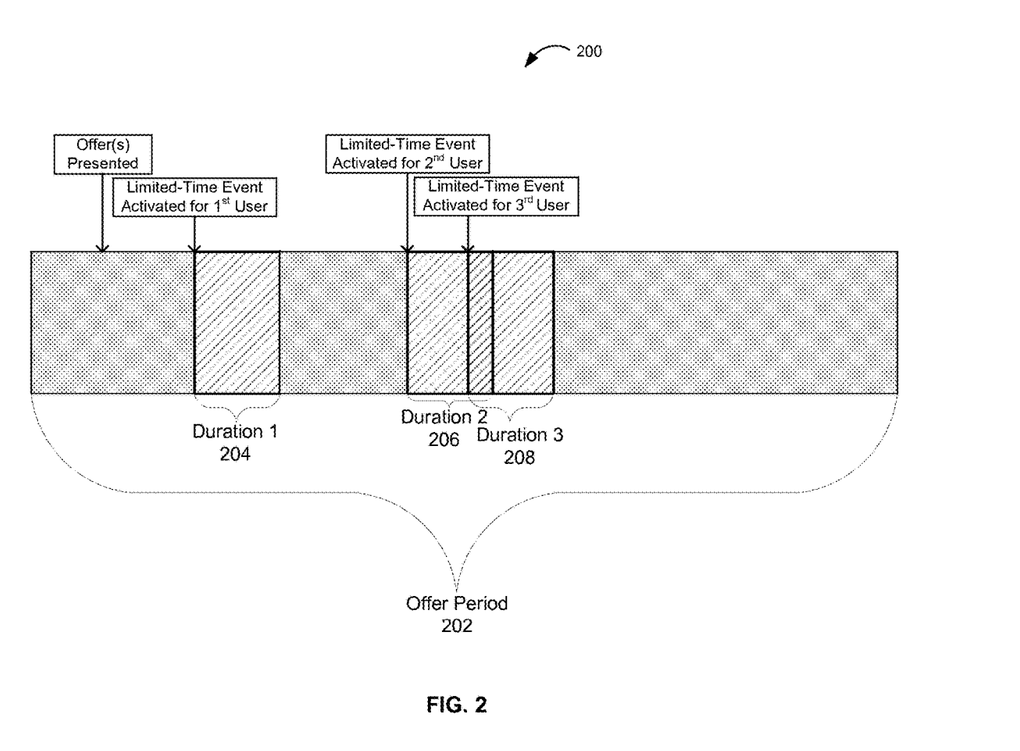
FIG. 2 illustrates a timeline for providing a limited-time event to a user in an online game, in accordance with one or more implementations.

FIG. 2 illustrates a timeline 200 for providing a limited-time event to a user in an online game, in accordance with one or more implementations. The illustration of timeline 200 according to the intervals presented herein are intended to be illustrative. In some embodiments, timeline 200 may include one or more additional actions and/or intervals not described, and/or omit one or more actions and/or intervals described. Additionally, the order in which the actions and/or intervals of timeline 200 are illustrated in FIG. 2 and described herein is not intended to be limiting.

In some embodiments, timeline 200 may include an offer period 202. Offer period 202 may include a period of time during which one or more offers to activate a limited-time event may be presented to one or more users. The offer period may also be the period during which the user may be able to accept the offer. One or more durations (e.g., 204, 206, and 208) may be periods of time during which one or more users may perform one or more event runs through the limited-time event. Activation of one or more durations including a first duration 204, a second duration 206, a third duration 208, and/or other durations may occur during offer period 202. In some implementations, one or more durations may overlap in time. The first duration 204, the second duration 206, the third duration 208, and/or other durations may have the same length.

First duration 204 may begin in response to the limited-time event being activated by the first user. Second duration 206 may begin in response to the limited-time event being activated by the second user. Third duration 208 may begin in response to the limited-time event being activated by the third user. Activation of one duration by a given user (e.g., first duration 204, second duration 206, third duration 208, and/or other durations) may not affect activation of another duration (e.g., first duration 204, second duration 206, third duration 208, and/or other durations) by another user. Thus, multiple durations may be activated and/or running at the same time and/or different times.

The limited-time event may be activated by the user in response to the acceptance of the offer to the user. In some implementations, more than one offer may be presented to the user during offer period 202. More than one offer may only be presented to the user until the user activates the limited-time event. Once the user accepts the offer and activates the limited-time event, starting the duration, the user may not be presented with any more offers for the rest of the offer period. In some implementations, the limited-time event may be activated immediately after the one or more offers are presented to the user. In some implementations, the user may wait a little time after the one or more offers are presented before activating the limited-time event. The user may activate the limited-time event after a first offer is presented such that a second offer is not presented to the user. In some implementations, more than two offers may be presented to the user during offer period 202 until the user activates the limited-time event.

Returning to FIG. 1, game component 22 may be configured to execute an instance of an online game. The instance of the online game may facilitate user participation in the online game by executing actions in the instance of the online game. Actions may be executed in the instance of the online game in response to user commands received from client computing platforms associated with the users.

The instance of the online game may be provided via a virtual space, and may be executed by computer components to determine game state information for the game and/or the virtual space. The game state information may then be communicated from server(s) 12 and/or sources to client computing platforms 14 for presentation to users. For example, client computing platforms 14 may implement game state information to present and/or update views of the game and/or the virtual space. The view determined for presentation at a given client computing platform 14 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The description herein of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., virtual resources and/or virtual items) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server(s) 12. In some implementations, game component 22 may be configured to implement the delivery of the limited-time event to users in connection with in-game implementation as described herein.

The instance of the virtual space and/or the online game may be persistent. That is, the virtual space and/or the online game may continue on whether or not individual users are currently logged in and/or participating in the online game. A user that logs out of the online game and then logs back in some time later may find the virtual space associated with the online game has been changed through the interactions of other users with the virtual space during the time the user was logged out. These changes may include changes to the simulated physical space, changes in the user's inventory, changes in other users' inventories, changes experienced by non-user characters, and/or other changes.

Game component 22 may be configured such that the execution of actions in the instance of the online game, in response to the user's commands, may require, or cost, an amount of a first virtual resource, and/or other virtual resources. The first virtual resource may be referred to as fuel, turns, energy, and/or other names. The execution of actions in the instance of the online game may deplete the first virtual resource in the inventories of the users requesting the actions. The execution of an action may deplete the first virtual resource in the inventory of a user requesting the action by an amount that is pre-determined. This amount may be referred to as the cost of the action. One or more actions may have costs that vary. The variation may be random, pseudorandom, based on user specified parameters for the action, and/or based on other factors. By way of non-limiting example, in a turn-based game, one turn or attempt may require a number (e.g., 1 or some other number) of units of the first resource.

Actions requested by a first user and executed by the game component during the limited-time event for the first user may be part of a performance of one or more event runs through the limited-time event by the first user. As such, execution of event runs through the limited-time event in response to user commands received from a first client computing platform associated with the first user may deplete the first virtual resource in an inventory of the first user.

Inventory component 24 may be configured to maintain inventories of the users. The inventories may reflect amounts of virtual resources and/or other virtual items controlled by users of the instance of the online game for their use in the online game. Such accounting of virtual resources and/or virtual items may reflect balances of the virtual resources and/or virtual items, including those associated with a given user. The balances of virtual items in the user inventory may increase, decrease, deplete, recharge, replenish, or exhaust in response to user actions, game space events and/or activities participated in by the user (e.g., performing event runs through the limited-time event), and/or other events associated with the user in which the user may exchange for, purchase, win, deplete, replenish, recharge, and/or consume the virtual resources and/or virtual items.

Inventory component 24 may maintain amounts of multiple virtual items and/or virtual resources for multiple users. For example, an inventory for the first user may include an amount of the first virtual resource controlled by the first user. Virtual resources and/or virtual items may include one or more virtual currencies, objects, units, and/or any other virtual resources and/or virtual item. Virtual currencies may include a virtual soft currency (i.e., a virtual currency earned through one or more actions within a game), a virtual hard currency (i.e., a virtual currency backed by real world value), a mixed virtual currency (e.g., part virtual hard currency, part virtual soft currency), and/or other virtual currencies. Within the instance of the game space, virtual currencies may be provided to store and/or exchange game space values.

Units of the virtual currencies (for example, gold, silver, a gem, a coin, a token, and/or any other types of virtual currencies) may reflect game space values as determined by a provider, administrator, moderator, user, and/or any other entities related to the game space. Through one or more units of virtual currencies, game space values may be captured, stored, and circulated in the game space. As one non-limiting example, combinations of user actions, skills, virtual items, time, and/or any other game space elements may be captured, stored and circulated through virtual currencies to reflect the game space values created by user labor in interacting with the game space. Within the instance of the game space, the virtual currencies may be collected, earned, purchased, gifted, or otherwise acquired by the users. For example, the users may purchase the virtual currencies (e.g., virtual hard currencies) with real-world money consideration (e.g., credit payment through credit card, electronic vouchers provided by the provider of the game space, physical tokens, and/or any other types of real-world currencies) through a virtual store. In some instances, the user may be awarded virtual currencies including virtual hard currency and/or virtual soft currency though one or more actions in the instance of the online game (e.g., event runs through the limited-time event). The users may earn the virtual currencies (e.g., virtual soft currency), for example through gameplays provided in the game space (e.g., event runs through the limited-time event, PvP activities, PvE actives, in game tournaments, tasks, quests, missions, and/or any other gameplays in the game space).

Virtual resources may be, for example, accumulated, generated, cultivated, mined, harvested, purchased, earned, consumed, traded, and/or gifted over time within the instance of the online game by units, characters, pets, buildings, facilities, and/or any other infrastructure or entity in the game space for the user. Virtual resources may be virtual items of value that can be accumulated through participation in the game space, rather than virtual currencies that store values in the game space as described herein. Virtual resources may be accumulated automatically as a function of time.

In some implementations, virtual resources in the inventories of the users may be used to satisfy resource requirements in the game space. By way of non-limiting examples, virtual resources may include stamina, energy, lives, food (e.g., rice, fish, wheat, etc.), wood, minerals (e.g., good, iron, ore, coal, oil, stone, crystal, etc.), plants, animals, and/or any other resources appropriate for the game space. Changes in a level and/or balance of a virtual resource may be reflected by user inventories. For example, as the first user requests actions, and such actions are executed to perform event runs through the limited-time event, the first virtual resource in the inventory for the first user may be depleted. The depleted balance level may be displayed to the first user.

Recharge component 26 may recharge the first virtual resource in the inventories of the users. Recharge component 26 may be configured to recharge the first virtual resource as a function of time. The first virtual resource may be recharged as a function of time according to a recharge rate. The recharge rate may define the amount the first virtual resource accumulates, replenishes, and/or recharges in a given period of time. The recharge rate may be increased and/or decreased by one or more user actions, achievements, characteristics, inventories, and/or other factors within an instance of the online game. The recharge may occur without regard for user activity and/or action within the online game.

The execution of actions and the execution of event runs in response to user commands from the first user may both require and deplete the amount of the first virtual resource in the first inventory. Without enough of the first virtual resource included in the inventory for the first user, the first user may have to wait until the first virtual resource in the first inventory is recharged, and/or otherwise obtain more of the first virtual resource before the system will execute actions and event runs in response to the first user's commands.

In some implementations, the recharge rate is slow enough and/or the cost in the first virtual resource for the actions for an event run is great enough that the first virtual resource will not recharge quickly enough after its depletion to enable a user to perform consecutive event runs through the limited-time event throughout the duration. By way of example, a first user may be able to perform some number (e.g., one) event run through the limited-time event before their inventory of the first virtual resource is depleted and must be recharged. Continuing the example, if the user waits for the first virtual resource to recharge according to the recharge rate, the duration may end before the user has enough of the first virtual resource to perform any more event runs through the limited-time event.

Performance component 28 may be configured to assess performance of the user during event runs through the limited-time event. In some implementations, the assessment of the performance of the users may be quantified by a performance assessment metric. The performance assessment of the users during event runs through the limited-time event may correspond to the number of event runs through the limited-time event performed by the users during the duration. In some implementations, the performance assessment of the users may directly and/or indirectly correspond to the number of event runs through the limited-time event performed by the users during the duration. For example, a user may receive an assessment metric for each event run through the limited-time event performed.

In some implementations, the metrics for performance of multiple event runs through the limited-time event may be added together for a total metric. In some implementations, the metrics for the performance of multiple event runs through the limited-time event may be averaged (or aggregated in some other manner) to determine the total metric. In some implementations, the highest metric achieved may represent the total metric. As such, the more event runs a user performs through the limited time event the higher their metric and/or the greater chance they have at achieving a higher metric.

Award component 30 may be configured to distribute awards to the users based on the assessment of their performance during the event runs through the limited-time event. As such, in some implementations, the awards and/or the likelihood of receiving an award may be affected by the number of event runs through the limited-time event performed by the user. For example, the more even runs through the limited-time event performed by the user, the higher their award and/or the greater their chance of receiving an award may be. As such, users may be enticed to perform as many event runs as possible during the duration. In some implementations, awards may include bonus awards that are better than the awards typically offered within the instance of the online game. The user may access the bonus awards by performing one or more event runs through the limited-time event during the duration. For example, a limited-time event may include an award of 5× gold during which the user can earn up to five times the amount of gold they would be able to earn during the instance of the online game outside the limited-time event.

Awards may include virtual items and/or virtual resources such as one or more of virtual currencies, credits, objects, units, and/or any other virtual resources and/or virtual item. Virtual currencies may include one or more of a virtual hard currency, a virtual soft currency, a mixed virtual currency, and/or another virtual currency. For example, an award may include virtual gold coins. In some implementations, award component 30 may be configured to distribute awards based on a relative performance (e.g., assessment of user's performance compared to other users). Awards may be based on relative performance of the user during a portion of and/or the entire limited-time event. In some implementations, award component 30 may be configured to distribute awards based on absolute performance (e.g., an assessment of a user's performance reaching a given threshold).

Exchange component 32 may be configured to effectuate exchanges by the users of virtual items for the first virtual resource. Without exchanging one or more virtual items for the first virtual resource, the recharge of the first virtual resource, the depletion of the first virtual resource by performance of activities in the course of event runs, the duration length, and/or other factors may limit a number of event runs that are performable by the first user during the duration. As such, because the user is incentivized to perform as many event runs through the limited-time event as possible during the duration, the user is enticed to exchange one or more virtual items for the first virtual resource.

Virtual items exchanged for the first virtual resource may include a virtual currency such as a virtual hard currency. By way of example, the exchange component 32 may be configured to enable a user to purchase the virtual hard currency via a credit/debit/gift card transaction, check, online money transfer (e.g., via PayPal), and/or other hard currency transaction methods. The virtual hard currency may be exchanged for the first virtual resource in the instance of the online game such that the user pays to refill the first virtual resource instantly. As such, the user would not have to wait for the first virtual resource to recharge via the recharge component according to the recharge rate.

Exchange component 32 may receive a request to exchange virtual items for the first virtual resource from the first user. The first user may make a request to exchange virtual items for the first virtual resource responsive to depleting the first virtual resource in their inventory. One or more of exchange component 32, event component 20, game component 22, inventory component 24, recharge component 26, and/or other components may communicate in order to monitor, adjust, display, indicate, and/or otherwise manage inventories for the exchange of virtual items for the first virtual resource.

In some implementations, the user may have enough of the first virtual resource to perform a number (e.g., 1 or some other number) of event runs through the limited-time event without exchanging one or more virtual items for the first virtual resource. After a given number of event runs, the first virtual resource in the inventory for the first user may be depleted and the first user may have to either wait for it to refill, or exchange one or more virtual items for the first virtual resource (e.g., paying to refill the first virtual resource instantly). However, since the duration has begun and will continue to run if the user waits for the first virtual resource to refill, the user may not be able to perform any additional event runs through the limited time event during the duration. As such, the user may be enticed to exchange one or more virtual items for the first virtual resource (e.g., pay to refill their stamina) one or more times during the duration so they can perform as many limited-time event runs as possible. Performing as many limited-time runs as possible may increase a user's performance and/or awards enabling them to take full advantage of the limited-time event.

In some implementations, event component 20, game component 22, and/or other components may be configured to effectuate presentation of one or more notifications to one or more users. The one or more users may include the first user. One or more notifications may be displayed in one or more fields in the graphical user interface within the virtual space. In some implementations one or more notifications may include an alert dialog box, a dialog box, a text box, an icon, a graphic, and/or other item displayed in the graphical user interface within the virtual space.

In some implementations, one or more notifications may be presented to one or more users with the one or more offers to activate the limited-time event. For example, event component 20 may effectuate presentation of an offer to activate the limited-time event to a given user along with a notice that the user may only activate the limited-time event once and/or that they will only have one hour to complete as many event runs as possible. Notifications presented with the one or more offers may include one or more of a notice that activating the offer will begin the duration, a notice that once the duration has begun it cannot be paused or re-started, a notice indicating the duration length, a notice indicating an offer period during which the user may be able to accept the offer, and/or other notifications related to activation of the limited-time event, the duration, and/or the offer period.

In some implementations, event component 20, game component 22 and/or other components may effectuate presentation of one or more notifications after activation of the limited-time event by the user. One or more notifications may include one or more of a remaining length of the duration, a passed length of the duration, a remaining amount of the first virtual resource, a prompt for an exchange by the first user of virtual items for the first virtual resource, and/or other notices related to the duration, a virtual resource, a virtual item, and/or an exchange. For example, game component 22 may effectuate presentation of a timer indicating the time remaining in the duration. By way of another example, game component 22 may effectuate presentation of a notice to the user that their inventory of the first virtual resource has been depleted and they must either wait for it to refill, or exchange virtual items for the first virtual resource before being able to continue to perform event runs through the limited-time event.

Game component 22, in some implementations, may communicate with event component 20 in order to pause the duration. While the user may not be able to pause the duration, game component 22, event component 20, and/or other components may be configured to pause the duration for one or more reasons. For example, the duration may be paused in order to facilitate an exchange of one or more virtual items for the first virtual resource. While the duration is paused, the user may not be able to perform event runs through the limited-time event.

In some implementations, game component 22 may be configured to effectuate presentation of one or more notifications to users based on the assessment of the performance of one or more of the users during event runs through the limited-time event. By way of example, a user may be presented with a notification that another user just performed a record setting event run though the limited-time event earning 50,000 gold coins. One or more notifications may include one of more of a notice of the assessment of the performance of another user, a notice of the assessment of the performance of the first user, a notice of the assessment of the performance of the first user compared to the assessment of the performance of one or more other users, a notice of one or more of the awards, and/or other notices related to the assessment of the performance of one or more users and/or the awards distributed to one or more users.

In some implementations, game component 22 may be configured to effectuate presentation of one or more leaderboards. The one or more leaderboards may include a performance assessment metric of one or more users during one or more event runs though the limited time event. For example, the leaderboard may provide a real-time display of the performance assessment metrics of the users having the highest performance assessment metrics.

The limited-time event, in some implementations may include tournament play such that game component 22 is configured to effectuate presentation of offers to users selected to participate in the tournament. The users may perform event runs through the limited-time event (e.g., timed tournament rounds) for the duration (e.g., the length of the round). Game component 22 may be configured to present the offers to users when they are online. As such, the users selected to participate in the tournament do not all have to be online at the same time. The offers may be presented to users during an offer period so that in order to participate, each user has to accept the offer within the offer period. For example, each user could perform one or more event runs through the limited time event for the duration at various times within a given period of time. Continuing the example, the end of the offer period and/or the end of the given period of time may be the end of the tournament play. At the end of the tournament play, the assessment of the performance of each user may be combined, compared, and/or otherwise analyzed to determine an outcome and distribute awards.

In some implementations, server(s) 12, client computing platforms 14, and/or external resources 34 may be operatively linked via one or more electronic communication links. For example, such electronic communication links may be established, at least in part, via a network such as the Internet and/or other networks. The network may be a wired or wireless network such as the Internet, an intranet, a LAN, a WAN, a cellular network or another type of network. It will be understood that the network may be a combination of multiple different kinds of wired or wireless networks. It will be appreciated that this is not intended to be limiting, and that the scope of this disclosure includes implementations in which server(s) 12, client computing platforms 14, and/or external resources 34 may be operatively linked via some other communication media.

A given client computing platform 14 may include one or more processors configured to execute computer program components. The computer program components may be configured to enable an expert or user associated with the given client computing platform 14 to interface with system 10 and/or external resources 34, and/or provide other functionality attributed herein to client computing platforms 14. By way of non-limiting example, the given client computing platform 14 may include one or more of a desktop computer, a laptop computer, a handheld computer, a tablet computing platform, a netbook, a smartphone, a gaming console, and/or other computing platforms.

External resources 34 may include sources of information, hosts and/or providers of virtual environments outside of system 10, external entities participating with system 10, and/or other resources. In some implementations, some or all of the functionality attributed herein to external resources 34 may be provided by resources included in system 10.

Server 12 may include electronic storage 36, one or more processors 18, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

Electronic storage 36 may comprise non-transitory storage media that electronically stores information. The electronic storage media of electronic storage 36 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 36 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 36 may include one or more virtual storage resources (e.g., cloud storage, a virtual private network, and/or other virtual storage resources). Electronic storage 36 may store software algorithms, information determined by processor 18, information received from server 12, information received from client computing platforms 14, and/or other information that enables server 12 to function as described herein.

Processor(s) 18 is configured to provide information processing capabilities in server 12. As such, processor 18 may include one or more of a digital processor, an analog processor, a digital circuit designed to process information, an analog circuit designed to process information, a state machine, and/or other mechanisms for electronically processing information. Although processor 18 is shown in FIG. 1 as a single entity, this is for illustrative purposes only. In some implementations, processor 18 may include a plurality of processing units. These processing units may be physically located within the same device, or processor 18 may represent processing functionality of a plurality of devices operating in coordination. The processor 18 may be configured to execute components 20, 22, 24, 26, 28, 30, and 32. Processor 18 may be configured to execute components 20, 22, 24, 26, 28, 30, and 32 by software; hardware; firmware; some combination of software, hardware, and/or firmware; and/or other mechanisms for configuring processing capabilities on processor 18. As used herein, the term "component" may refer to any component or set of components that perform the functionality attributed to the component. This may include one or more physical computer processors during execution of processor readable instructions, the processor readable instructions, circuitry, hardware, storage media, or any other components.

It should be appreciated that although components 20, 22, 24, 26, 28, 30, and 32 are illustrated in FIG. 1 as being implemented within a single processing unit, in implementations in which processor 18 includes multiple processing units, one or more of components 20, 22, 24, 26, 28, 30, and 32 may be implemented remotely from the other components. The description of the functionality provided by the different components 20, 22, 24, 26, 28, 30, and 32 described herein is for illustrative purposes, and is not intended to be limiting, as any of components 20, 22, 24, 26, 28, 30, and 32 may provide more or less functionality than is described. For example, one or more of components 20, 22, 24, 26, 28, 30, and 32 may be eliminated, and some or all of its functionality may be provided by other ones of components 20, 22, 24, 26, 28, 30, and 32. As another example, processor 18 may be configured to execute one or more additional components that may perform some or all of the functionality attributed herein to one of components 20, 22, 24, 26, 28, 30, and 32.

Figure 3:
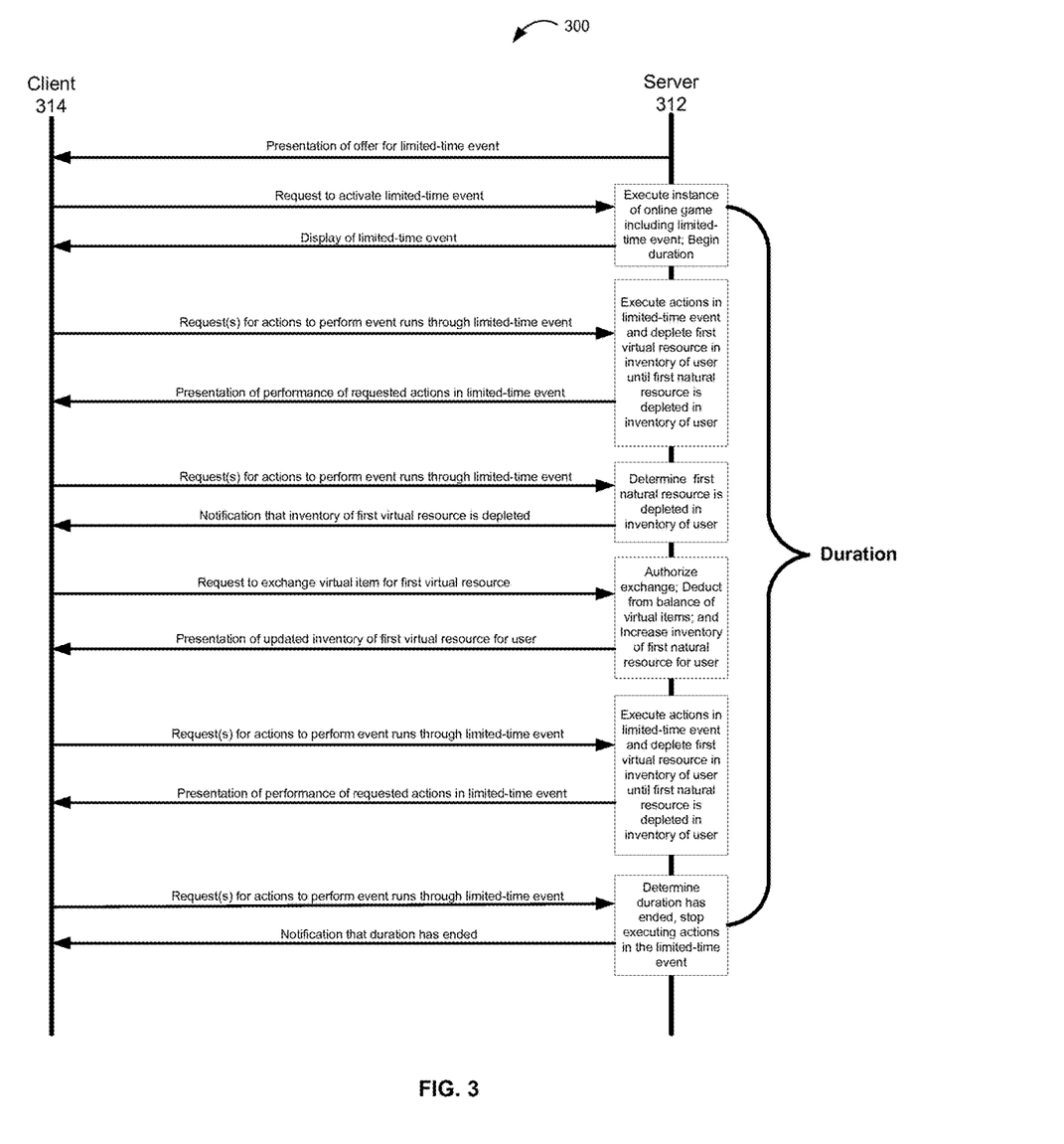
FIG. 3 illustrates a flowchart of providing a limited-time event to a user in an online game, in accordance with one or more implementations.

FIG. 3 illustrates a flowchart of providing a limited-time event to a user in an online game, in accordance with one or more implementations. System 10 (see FIG. 1) may execute the instance of the online game to facilitate user participation in the online game by executing actions in the instance of the online game via server 312 in response to user commands (e.g., requests) received from the client 314. The illustration of flowchart 300 according to the communications presented are intended to be illustrative. In some embodiments, flowchart 300 may include one or more additional communications and/or exchanges not described, and/or may omit one or more communications and/or exchanges described. Additionally, the order in which the communications and/or exchanges of flowchart 300 are illustrated in FIG. 3 and described herein is not intended to be limiting.

In some implementations, server 312 may send a presentation of one or more offers to activate a limited-time event to client 314. In response to one or more offers, client 314 may send a request to activate the limited-time event to server 312. Server 312 may begin the duration in response to client 314 sending a request to activate the limited-time event to server 312. Server 312 may execute the instance of online game including limited-time event and display the limited-time event to client 314. Client 314 may send one or more requests for actions to perform event runs through the limited-time event to server 312. Server 312 may execute the actions requested by client 314 and deplete a first virtual resource in an inventory of the user.

In some implementations, server 312 may only execute the actions requested by client 314 until the first virtual resource in the inventory of the user is depleted. Server 312 may present performance of the requested actions within the limited-time event to client 314. Client 314 may send one or more additional requests for actions to perform event runs through the limited-time event to server 312. Server 312 may determine that the first virtual resource in the inventory of the user is depleted and send a notification to client 314 that the first virtual resource is depleted.

In some implementations, client 314 may send a request to exchange virtual items for the first virtual resource to server 312. Server 312 may authorize the exchange (e.g., accept a payment authorization and facilitate a payment transaction). In some implementations, authorizing the exchange may include increasing an inventory of one or more virtual items in the inventory of the user. In response to a successful exchange authorization, server 312 may deduct virtual items from the balance of virtual items in the inventory for the user. Server 312 may increase the balance of the first virtual resource in the inventory for the user in response to the successful exchange authorization. Server 312 may present the updated inventory of the first virtual resource and/or other inventories to client 314.

Client 314 may send one or more additional requests for actions to perform event runs through the limited-time event to server 312. Server 312 may execute the actions requested by client 314 and deplete a first virtual resource in an inventory of the user. Server 312 may execute the actions requested by client 314 responsive to determining the inventory of the first virtual resource is not depleted. Server 312 may present performance of the requested actions within the limited-time event to client 314. Client 314 may send one or more additional requests for actions to perform event runs through the limited-time event to server 312. Server 312 may determine that the duration has ended and stop executing the requested actions. Server 312 may notify client 314 that the duration has ended.

Figure 4:
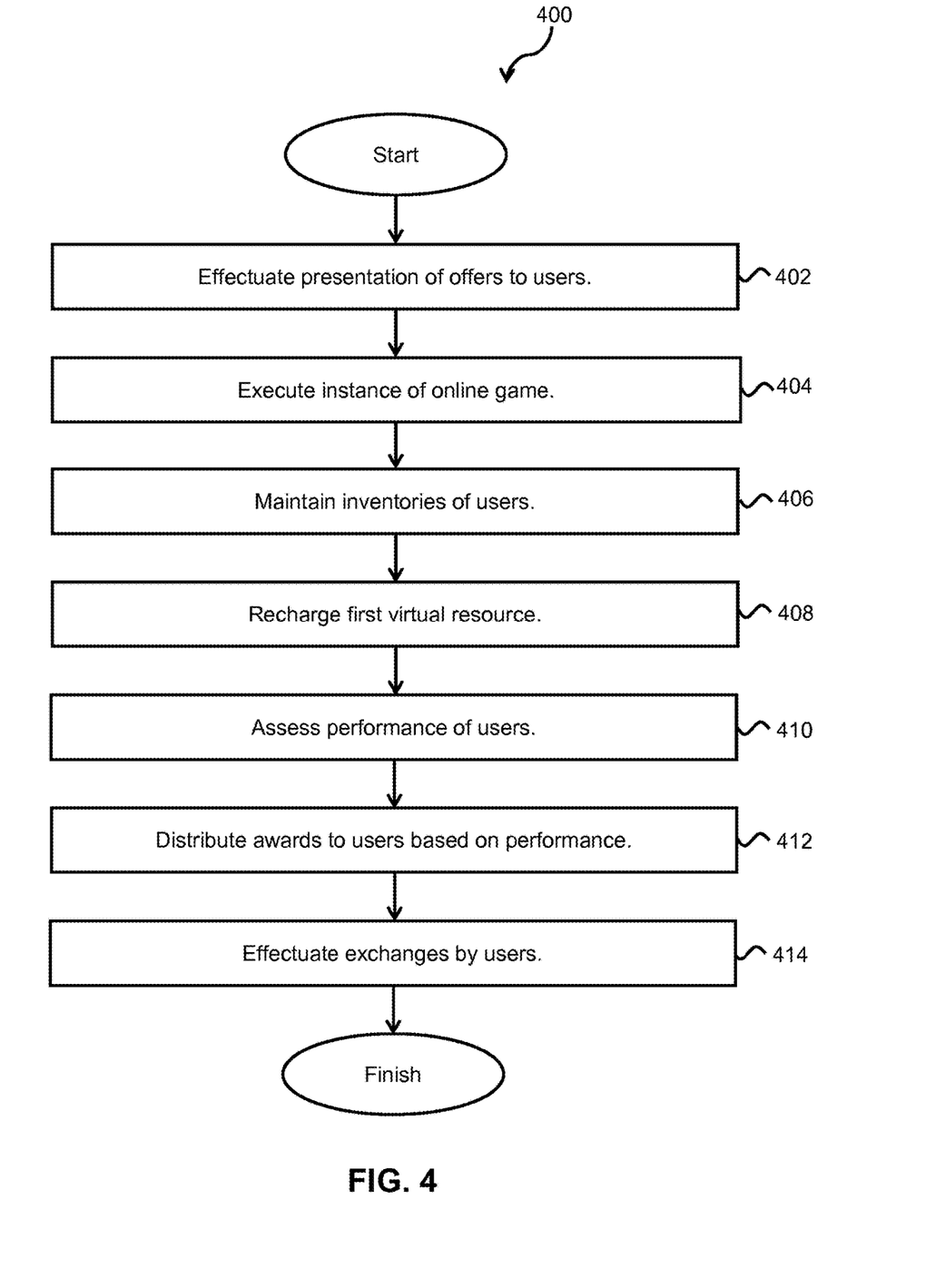
FIG. 4 illustrates an implementation of a method for providing limited-time events to users in an online game, in accordance with one or more implementations.

FIG. 4 illustrates a method 400 for providing limited-time events to users in an online game, in accordance with one or more implementations. The operations of method 400 presented herein are intended to be illustrative. In some embodiments, method 400 may be accomplished with one or more additional operations not described, and/or without one or more of the operations discussed. Additionally, the order in which the operations of method 400 are illustrated in FIG. 4 and described herein is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 402, presentation of offers to activate a limited-time event within an online game may be effectuated to users. The users may include a first user. Activation of the limited-time event may enable users to perform event runs through the limited-time event in the online game for a duration. The duration may have a duration length. The durations for the individual users may begin in response to offer activations by the individual users. As such, the duration for the first user may begin in response to offer activation by the first user. In some implementations, operation 402 may be performed by an event component the same as or similar to event component 20 (shown in FIG. 1 and described herein).

At operation 404, an instance of the online game may be executed to facilitate user participation in the online game. The instance of the online game may facilitate user participation in the online game by executing actions in the instance of the online game in response to user commands received from client computing platforms associated with the users. The execution of actions in the instance of the online game may deplete a first virtual resource in the inventories of the users requesting the actions. As such, execution of event runs through the limited-time event in response to user commands received from a first client computing platform associated with the first user may deplete the first virtual resource in an inventory of the first user. In some implementations, operation 404 may be performed by a game component the same as or similar to game component 22 (shown in FIG. 1 and described herein).

At operation 406, inventories of the users may be maintained. Inventories may include an inventory of the first virtual resource and/or other virtual items. In some implementations, operation 406 may be performed by an inventory component the same as or similar to inventory component 24 (shown in FIG. 1 and described herein).

At operation 408, the first virtual resource may be recharged. The first virtual resource may be recharged in the inventories of the users as a function of time. The first virtual resource may be recharged according to a recharge rate. In some implementations, operation 408 may be performed by a recharge component the same as or similar to recharge component 26 (shown in FIG. 1 and described herein).

At operation 410, performance of the users during event runs through the limited-time event may be assessed. The assessment of the performance of the users during event runs through the limited-time event may correspond to the number of event runs through the limited-time event performed by the user during the duration. In some implementations, operation 410 may be performed by a performance component the same as or similar to performance component 28 (shown in FIG. 1 and described herein).

At operation 412, awards may be distributed to the users based on the assessment of the performance of the users during the event runs through the limited-time event. Awards may include one or more virtual items and/or resources such as, for example, a virtual currency. In some implementations, operation 412 may be performed by an award component the same as or similar to award component 30 (shown in FIG. 1 and described herein).

At operation 414, exchanges by the users of virtual items for the first virtual resource may be effectuated. Wherein, a number of event runs that are performable by the first user during the duration without exchanging one or more virtual items for the first virtual resource may be limited by (i) the recharge of the first virtual resource, (ii) the depletion of the first virtual resource by performance of event runs, and/or (iii) the duration length. In some implementations, operation 414 may be performed by an exchange component the same as or similar to exchange component 32 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing limited-time events to users in an online game, the system comprising:
one or more physical computer processors configured by machine readable instructions to:
effectuate presentation of offers to the users to activate a limited-time event within an online game, the users including a first user, wherein the offers include a first offer to the first user, wherein activation of the limited-time event enables the users to participate in the limited-time event for a duration having a duration length, the durations for individual users beginning in response to offer activations by the individual users such that a first duration having the duration length begins in response to a first offer activation by the first user of the first offer;
maintain inventories of the users, wherein the inventories include a first inventory of the first user;
execute an instance of the online game to facilitate user participation in the online game by executing actions in the instance of the online game in response to user commands received from client computing platforms associated with the users, wherein execution of actions in the instance of the online game depletes a first virtual resource in the inventories of the users requesting the actions such that participation in the limited-time event in response to one or more user commands received from a first client computing platform associated with the first user depletes the first virtual resource in the first inventory;
recharge the first virtual resource in the inventories of the users at a recharge rate, wherein the recharge rate is a function of time;
assess performance of the users during participation in the limited-time event;
distribute awards to the users based on the assessed performance; and
effectuate exchanges by the users, wherein the users exchange virtual items for an additional amount of the first virtual resource,
wherein at least (i) the recharge rate of the first virtual resource, (ii) the depletion of the first virtual resource due to participation in the limited-time event, and (iii) the duration length of the first duration limit an amount of participation by the first user during the first duration without exchanging one or more virtual items for the additional amount of the first virtual resource because absent such exchange the first user would not have enough of the first virtual resource to achieve a maximum amount of participation during the limited-time event.

2. The system of claim 1, wherein the virtual items exchanged for the additional amount of the first virtual resource include a virtual hard currency.

3. The system of claim 1, wherein the awards distributed to the users based on the assessed performance include one or both of a virtual hard currency and/or a virtual soft currency.

4. The system of claim 1, wherein the presentation of offers to the users to activate the limited-time event within the online game is effectuated during an offer period, wherein the offer period includes a period of time during which the first user is able to accept the first offer.

5. The system of claim 4, wherein acceptance of the first offer to activate the limited-time event by the first user only occurs once during the offer period such that the first user is only able to participate in the limited-time event for one duration per offer period.

6. The system of claim 1, wherein the one or more physical computer processors are further configured by machine readable instructions to effectuate presentation of one or more notifications to one or more users, including the first user.

7. The system of claim 6, wherein the one or more notifications are presented to the one or more users, including the first user, with the offers to activate the limited-time event, and wherein the one or more notifications include one or more of a notice that activating the first offer will begin the duration, a notice that once the duration has begun it cannot be paused or re-started, a notice indicating the duration length, and/or a notice indicating an offer period during which the first user is able to accept the first offer.

8. The system of claim 6, wherein the one or more notifications are presented to the one or more users, including the first user, after activation of the limited-time event by the first user, and wherein the one or more notifications include one or more of a remaining length of the duration, a passed length of the duration, a remaining amount of the first virtual resource, and/or a prompt for an exchange by the first user of virtual items for the additional amount of the first virtual resource.

9. The system of claim 6, wherein the one or more notifications are presented to the one or more users, including the first user, based on the assessed performance of individual ones of the one or more users during event runs through the limited-time event; wherein the one or more notifications include one or more of a notice of the assessed performance of another user, a notice of the assessed performance of the first user, a notice of the assessed performance of the first user compared to the assessed performance of one or more other users, and/or a notice of one or more of the awards.

10. The system of claim 1, wherein the one or more physical computer processors are further configured by machine readable instructions to effectuate presentation of one or more leaderboards, wherein the one or more leaderboards include a performance assessment metric of one or more users during participation in the limited-time event.

11. A method for providing limited-time events to users in an online game, the method performed using one or more physical computer processors, the method comprising:
effectuating presentation of offers to the users to activate a limited-time event within an online game, the users including a first user, wherein the offers include a first offer to the first user, wherein activation of the limited-time event enables the users to participate in the limited-time event for a duration having a duration length, the durations for individual users beginning in response to offer activations by the individual users such that a first duration having the duration length begins in response to a first offer activation by the first user of the first offer;
maintaining inventories of the users, wherein the inventories include a first inventory of the first user;
executing an instance of the online game to facilitate user participation in the online game by executing actions in the instance of the online game in response to user commands received from client computing platforms associated with the users, wherein execution of actions in the instance of the online game depletes a first virtual resource in the inventories of the users requesting the actions such that participation in the limited-time event in response to one or more user commands received from a first client computing platform associated with the first user depletes the first virtual resource in the first inventory;

recharging the first virtual resource in the inventories of the users at a recharge rate, wherein the recharge rate is a function of time;

assessing performance of the users during participation in the limited-time event;

distributing awards to the users based on the assessed performance; and effectuating exchanges by the users, wherein the users exchange virtual items for an additional amount of the first virtual resource, wherein at least (i) the recharge rate of the first virtual resource, (ii) the depletion of the first virtual resource due to participation in the limited-time event, and (iii) the duration length of the first duration limit an amount of participation by the first user during the first duration without exchanging one or more virtual items for the additional amount of the first virtual resource because absent such exchange the first user would not have enough of the first virtual resource to achieve a maximum amount of participation during the limited-time event.

12. The method of claim 11, wherein the virtual items exchanged for the additional amount of the first virtual resource include a virtual hard currency.

13. The method of claim 11, wherein the awards distributed to the users based on the assessed performance include one or both of a virtual hard currency and/or a virtual soft currency.

14. The method of claim 11, further comprising effectuating presentation of the offers to the users to activate the limited-time event within the online game during an offer period, wherein the offer period includes a period of time during which the first user is able to accept the first offer.

15. The method of claim 11, wherein acceptance of the first offer to activate the limited-time event by the first user only occurs once during the offer period such that the first user is only able to participate in the limited-time event for one duration per offer period.

16. The method of claim 11, further comprising effectuating presentation of one or more notifications to users including the first user.

17. The method of claim 16, wherein the one or more notifications are presented to the one or more users, including the first user, with the offers to activate the limited-time event, and wherein the one or more notifications include one or more of a notice that activating the first offer will begin the duration, a notice that once the duration has begun it cannot be paused or re-started, a notice indicating the duration length, and/or a notice indicating an offer period during which the first user is able to accept the first offer.

18. The method of claim 16, wherein the one or more notifications are presented to the one or more users, including the first user, after activation of the limited-time event by the first user, and wherein the one or more notifications include one or more of a remaining length of the duration, a passed length of the duration, a remaining amount of the first virtual resource, and/or a prompt for an exchange by the first user of virtual items for the additional amount of the first virtual resource.

19. The method of claim 16, wherein the one or more notifications are presented to the one or more users, including the first user, based on the assessed performance of individual ones of the one or more users during event runs through the limited-time event; wherein the one or more notifications include one or more of a notice of the assessed performance of another user, a notice of the assessed performance of the first user, a notice of the assessed performance of the first user compared to the assessed performance of one or more other users, and/or a notice of one or more of the awards.

20. The method of claim 11, further comprising effectuating presentation of one or more leaderboards, wherein the one or more leaderboards include a performance assessment metric of one or more users during participation in the limited-time event.

* * * * *